United States Patent
Kiyono et al.

(10) Patent No.: US 7,352,524 B2
(45) Date of Patent: Apr. 1, 2008

(54) MAGNETIC DISK DRIVE

(75) Inventors: Hiroshi Kiyono, Tokyo (JP); Yosuke Antoku, Tokyo (JP)

(73) Assignee: TDK Corporation, Tokyo (JP)

( * ) Notice: Subject to any disclaimer, the term of this patent is extended or adjusted under 35 U.S.C. 154(b) by 358 days.

(21) Appl. No.: 11/269,604

(22) Filed: Nov. 9, 2005

(65) Prior Publication Data

US 2007/0103808 A1   May 10, 2007

(51) Int. Cl.
G11B 21/02 (2006.01)
(52) U.S. Cl. .................................................. 360/75
(58) Field of Classification Search ............... 360/75, 360/69, 70, 77.02, 78.04, 235.1, 235.8, 235.2, 360/237, 97.1
See application file for complete search history.

(56) References Cited

U.S. PATENT DOCUMENTS

| | | | | |
|---|---|---|---|---|
| 5,078,846 A | * | 1/1992 | Miller et al. ............. | 204/192.2 |
| 5,202,803 A | * | 4/1993 | Albrecht et al. ......... | 360/97.02 |
| 5,267,104 A | * | 11/1993 | Albrecht et al. ......... | 360/97.02 |
| 5,302,434 A | * | 4/1994 | Doerner et al. .......... | 428/831 |
| 5,309,223 A | * | 5/1994 | Konicek et al. .......... | 356/621 |
| 5,374,463 A | * | 12/1994 | Bethune et al. .......... | 428/835.3 |
| 5,462,784 A | * | 10/1995 | Grill et al. ............... | 428/835.2 |
| 5,673,156 A | * | 9/1997 | Chen et al. ............... | 360/97.01 |
| 5,674,638 A | * | 10/1997 | Grill et al. ............... | 428/835.2 |
| 5,729,399 A | * | 3/1998 | Albrecht et al. .......... | 360/75 |
| 5,991,113 A | | 11/1999 | Meyer et al. | |
| 6,296,917 B1 | * | 10/2001 | Nakakawaji et al. ..... | 428/834 |
| 6,717,772 B2 | * | 4/2004 | Otsuka et al. ........... | 360/235.1 |
| 6,728,069 B2 | * | 4/2004 | Otsuka et al. ........... | 360/235.8 |
| 6,913,795 B2 | | 7/2005 | Hyodo | |
| 7,130,154 B2 | * | 10/2006 | Otsuka et al. ........... | 360/237 |
| 7,286,326 B2 | * | 10/2007 | Yasui et al. .............. | 360/235.2 |
| 2003/0074784 A1 | | 4/2003 | Konishi et al. | |
| 2003/0099054 A1 | | 5/2003 | Kamijima | |
| 2003/0174430 A1 | | 9/2003 | Takahashi et al. | |
| 2005/0175839 A1 | | 8/2005 | Hyodo | |
| 2006/0072246 A1 | * | 4/2006 | Fujimaki et al. ......... | 360/235.1 |

FOREIGN PATENT DOCUMENTS

| | | |
|---|---|---|
| JP | A 06-004856 | 1/1994 |
| JP | A 11-306704 | 11/1999 |
| JP | A 2000-030201 | 1/2000 |
| JP | A 2000-231768 | 8/2000 |
| JP | A 2001-195717 | 7/2001 |
| JP | A 2003-168274 | 6/2003 |
| JP | A 2003-226971 | 8/2003 |
| JP | A 2003-272335 | 9/2003 |

* cited by examiner

Primary Examiner—Fred F. Tzeng
(74) Attorney, Agent, or Firm—Oliff & Berridge, PLC

(57) ABSTRACT

A magnetic disk drive comprises a recording medium, a slider, and an alignment device for aligning the slider with respect to the medium. No film made of liquid lubricant is disposed on the surface of the medium. The slider incorporates: a slider main body including a thin-film magnetic head element disposed near a medium facing surface; and a protection film made of a tetrahedral amorphous carbon film for protecting the medium facing surface. The alignment device makes the slider retreat from the surface of the medium when the medium is stopped, and makes the slider face toward the surface of the medium when the medium is rotated. The magnetic disk drive further comprises a distance control device for controlling the distance between the medium and the thin-film magnetic head element.

4 Claims, 10 Drawing Sheets

MAGNETIC DISK DRIVE

BACKGROUND OF THE INVENTION

1. Field of the Invention

The present invention relates to a magnetic disk drive incorporating a slider including a thin-film magnetic head element and a recording medium that is driven to be rotated.

2. Description of the Related Art

A magnetic disk drive comprises a recording medium that is driven to be rotated and a thin-film magnetic head that writes data on the recording medium and reads data from the recording medium. The thin-film magnetic head incorporated in the magnetic disk drive is typically made up of a slider wherein a thin-film magnetic head element (that may be hereinafter simply called a head element) is provided at a rear end of the slider. The slider slightly flies above the surface of the recording medium by means of an air flow generated by a rotation of the medium.

The areal recording density of magnetic disk drives has dramatically increased. To achieve a further improvement in areal recording density, it is required to reduce the distance between the surface of a recording medium and the head element when the magnetic disk drive is operated. To be specific, the distance between the surface of the recording medium and the head element is recently 8 nm or smaller. A reduction in the distance between the surface of the medium and the head element contributes to improvements in reading output and writing characteristics.

On the other hand, if the distance between the surface of the recording medium and the head element is further reduced, the slider is likely to collide with the medium, and the medium or the head element is likely to be worn or damaged. To prevent such wear or damage of the recording medium and the head element, a lubricating film made of liquid lubricant is provided on the surface of the medium in prior art.

There are two types of start and stop systems of the magnetic disk drive: a contact-start-stop system and a load-unload system. In the contact-start-stop system, when the magnetic disk drive is stopped, that is, the recording medium is stopped, the slider is in contact with the medium. Then, after the magnetic disk drive is started, that is, the medium is started to rotate, the slider is made to fly above the surface of the medium by means of an air flow generated by the rotation of the medium. When the medium is stopped, the slider is brought to contact with the medium again. Japanese Published Patent Application H6-4856 discloses a technique in which the lubricating film provided on the recording medium is made to have different thicknesses between a data region and a region in which the slider performs contact and flying.

In the load-unload system, when the magnetic disk drive is stopped, the slider is made to retreat from the surface of the medium. Then, after the magnetic disk drive is started, the slider is loaded on the surface of the medium. When the magnetic disk drive is stopped, the slider is made to retreat (unloaded) from the surface of the medium. As a type of load-unload system, a ramp load system as disclosed in Japanese Published Patent Application H11-306704, for example, is widely employed. In the ramp load system, a ramp is provided near the recording medium while a tab is provided on a suspension flexibly supporting the slider. The tab gets on the ramp so that the slider leaves the surface of the medium. According to the load-unload system, it is possible to prevent a collision of the slider with the recording medium when the magnetic disk drive is started or stopped. Japanese Published Patent Application 2000-30201 discloses a technique in which the recording medium is rotated at 5000 rpm or greater, and a thickness of the lubricating film in a region where load or unload is performed is made greater when the medium rotates, compared with a thickness thereof when the medium is stopped.

On a surface of the slider that faces toward the recording medium, a protection film for protecting the head element is formed. A diamond-like-carbon film is widely used as the protection film. Japanese Published Patent Application 2001-195717 discloses a magnetic head comprising a protection film made up of a diamond-like-carbon film and a tetrahedral amorphous carbon film formed thereon. Japanese Published Patent Application 2003-226971 discloses a slider comprising a tetrahedral amorphous carbon film containing fluorine therein as a protection film.

As a technique for reducing the distance between the surface of the recording medium and the head element, a technique of dynamically controlling the distance between the surface of the medium and the head element is disclosed in each of U.S. Pat. No. 5,991,113, Japanese Published Patent Application 2003-168274, and Japanese Published Patent Application 2003-272335. According to this technique, a heating element is provided in the slider to cause an expansion of a portion of the slider by heat produced by the heating element to thereby bring the head element closer to the recording medium, and the distance between the surface of the medium and the head element is controlled by controlling the heating value.

As previously described, the distance between the surface of the recording medium and the head element in the magnetic disk drive has been reduced. Furthermore, in the magnetic disk drive, there are some cases in which the coil in the head element produces heat while writing is performed, thereby making the head element protrude to get closer to the medium, and the distance between the surface of the medium and the head element is thereby made smaller than a desired value. In addition, in the magnetic disk drive, there are some cases in which the distance between the surface of the medium and the head element is made smaller than a desired value because of factors such as variations in load applied to the slider by the suspension and variations in orientation of the slider when flying. Moreover, there are also cases in which the distance between the surface of the medium and the head element is made to be of a small value by the control of the distance between the surface of the medium and the head element as disclosed in each of U.S. Pat. No. 5,991,113, Japanese Published Patent Application 2003-168274, and Japanese Published Patent Application 2003-272335. It has been found out that the following problem arises when the distance between the surface of the medium and the head element is reduced because of the foregoing various factors. The problem is that, when this distance is reduced, the lubricating film on the recording medium flows and the thickness of the lubricating film varies even though the slider does not touch the medium, and, furthermore, the lubricating film and the slider resonate to cause vibrations of the slider. If the slider is thus vibrated, the distance between the head element and a magnetic layer of the recording medium varies and the error rate increases. It is difficult to reduce the distance between the surface of the medium and the head element while preventing vibrations of the slider due to the resonance of the lubricating film and the slider as mentioned above through the use of any of the techniques disclosed in Japanese Published Patent Application H6-4856, Japanese Published Patent Application H11-306704, Japanese Published Patent Application 2000-30201, Japanese Published Patent Application 2001-195717, Japanese Published Patent Application 2003-226971, U.S. Pat. No. 5,991,113, Japanese Published Patent Application 2003-168274, and Japanese Published Patent Application 2003-272335.

OBJECT AND SUMMARY OF THE INVENTION

It is an object of the invention to provide a magnetic disk drive capable of reducing the distance between the surface of a recording medium and a thin-film magnetic head element while preventing vibration of a slider.

A magnetic disk drive of the invention comprises: a recording medium that is driven to be rotated; a slider disposed to face toward the recording medium; and an alignment device for aligning the slider with respect to the recording medium. The recording medium has a surface facing toward the slider, and no film made of liquid lubricant is disposed on this surface. The slider incorporates: a slider main body including a medium facing surface that faces toward the recording medium and a thin-film magnetic head element disposed near the medium facing surface; and a protection film for protecting the medium facing surface. The protection film is made of a tetrahedral amorphous carbon film. The alignment device makes the slider retreat from the surface of the recording medium when the medium is stopped, and makes the slider face toward the surface of the medium when the medium is rotated. The magnetic disk drive further comprises a distance control device for controlling the distance between the surface of the recording medium and the thin-film magnetic head element.

In the magnetic disk drive of the invention, no film made of liquid lubricant is disposed on the surface of the recording medium facing toward the slider. As a result, there occurs no vibration of the slider resulting from resonance of a film made of liquid lubricant and the slider. According to the invention, normally, the slider does not touch the recording medium, which owes to the operation of the alignment device. According to the invention, the protection film of the slider is made of a tetrahedral amorphous carbon film. Since the protection film has a low friction coefficient, vibration of the slider is suppressed even if the slider touches the recording medium. In the invention the distance control device controls the distance between the surface of the recording medium and the thin-film magnetic head element.

In the magnetic disk drive of the invention, the distance control device may incorporate a heating section built in the slider main body.

In the magnetic disk drive of the invention, the recording medium may incorporate a magnetic layer and a solid protection layer for protecting the magnetic layer, and the protection layer may be exposed in the surface.

In the magnetic disk drive of the invention, the thin-film magnetic head element may incorporate: a write element for writing data on the recording medium; and a read element for reading data written on the recording medium. In addition, the distance control device may make the distance between the surface of the recording medium and the thin-film magnetic head element smaller when writing is performed by the write element and when reading is performed by the read element, compared with occasions on which neither writing nor reading is performed.

In the magnetic disk drive of the invention, no film made of liquid lubricant is disposed on the surface of the recording medium facing toward the slider. As a result, there occurs no vibration of the slider resulting from resonance of a film made of liquid lubricant and the slider. According to the invention, the alignment device makes the slider retreat from the surface of the recording medium when the medium is stopped, and makes the slider face toward the surface of the medium when the medium is rotated. Therefore, normally, the slider does not touch the recording medium. According to the invention, the protection film of the slider is made of a tetrahedral amorphous carbon film. Since the protection film has a low friction coefficient, vibration of the slider is suppressed even if the slider touches the recording medium. In the invention the distance control device controls the distance between the surface of the recording medium and the thin-film magnetic head element. It is thereby possible to reduce the distance between the surface of the recording medium and the thin-film magnetic head element. The foregoing features of the invention make it possible to reduce the distance between the surface of the medium and the thin-film magnetic head element while preventing vibration of the slider.

Other and further objects, features and advantages of the invention will appear more fully from the following description.

DETAILED DESCRIPTION OF THE PREFERRED EMBODIMENT

Figure 1:
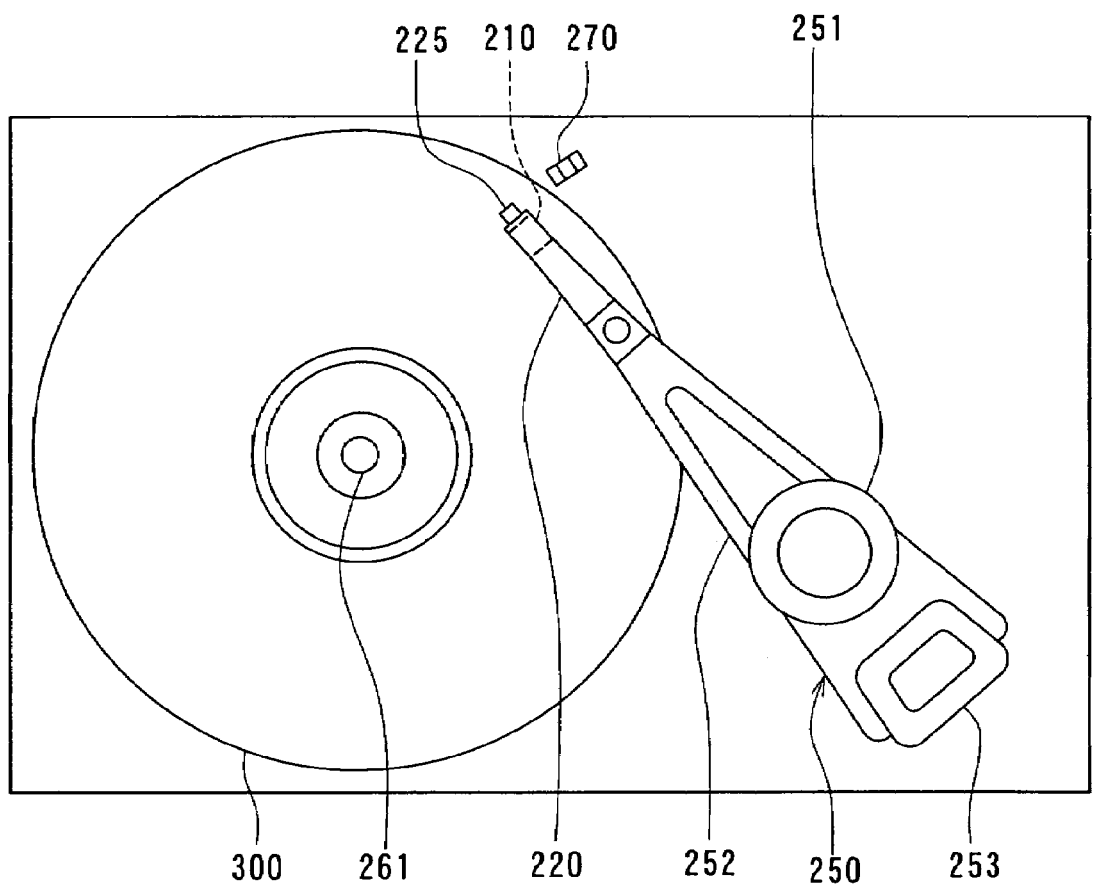
FIG. 1 is a top view of a magnetic disk drive of an embodiment of the invention.
Figure 2:
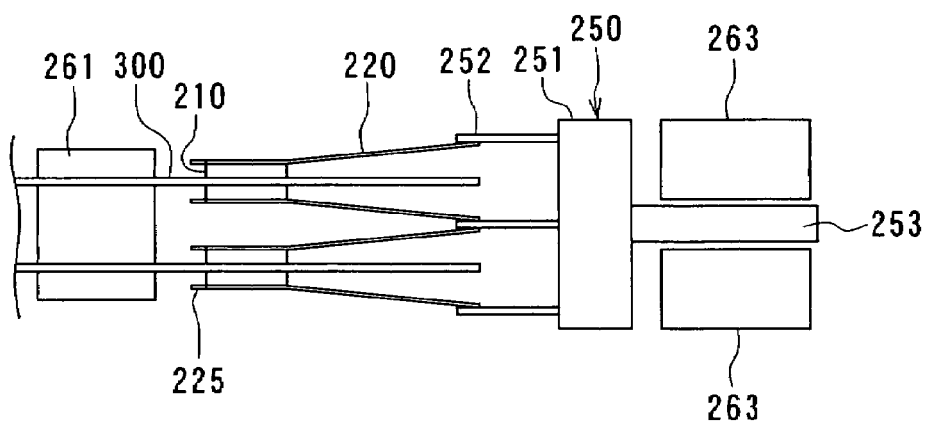
FIG. 2 is a view for illustrating a main part of the magnetic disk drive of the embodiment of the invention.

A preferred embodiment of the invention will now be described in detail with reference to the accompanying drawings. FIG. 1 is a top view of a magnetic disk drive of the embodiment of the invention. FIG. 2 is a view for illustrating a main part of the magnetic disk drive of the embodiment. As shown in FIG. 1 and FIG. 2, the magnetic disk drive of the embodiment comprises a plurality of recording media 300 attached to a spindle motor 261. Each of the recording media 300 is circular-plate-shaped and driven to be rotated by the spindle motor 261.

The magnetic disk drive further comprises a head stack assembly 250. The head stack assembly 250 incorporates a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of a voice coil motor is mounted on the carriage 251 on a side opposite to the arms 252. The voice coil motor includes permanent magnets 263 disposed to be opposed to each other, the coil 253 of the head stack assembly 250 being placed between the magnets 263.

Figure 3:
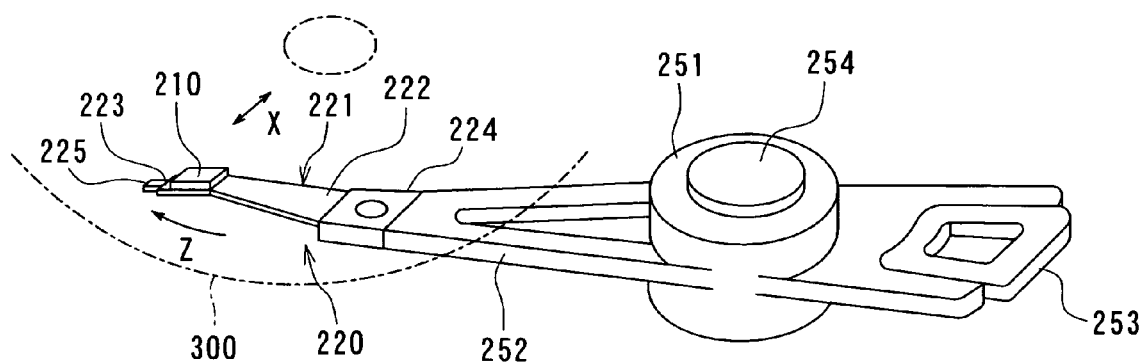
FIG. 3 is a perspective view illustrating a portion of the head stack assembly of FIG. 2.

FIG. 3 is a perspective view illustrating a portion of the head stack assembly 250. As shown in FIG. 3, the head gimbal assembly 220 comprises a slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; a base plate 224 located at the other end of the load beam 222; and a plate-shaped tab 225 provided to protrude from the flexure 223. The base plate 224 is attached to the arms 252 of the head stack assembly 250. The carriage 251 of the head stack assembly 250 is rotatably attached to an axis 254. In the magnetic disk drive, each of the arms 252 is circulated by the voice coil motor, and the slider 210 thereby moves along the X direction across the tracks of the recording medium 300. A gimbal section for maintaining the orientation of the slider 210 is provided in the portion of the flexure 223 on which the slider 210 is mounted.

As shown in FIG. 2, in the head stack assembly 250, the head gimbal assembly 220 is attached to each of the arms 252 of the carriage 251 having a plurality of arms 252. Each of the head gimbal assemblies 220 comprises the slider 210. Two of the sliders 210 are allocated to each of the recording media 300, such that the two sliders 210 are opposed to each other with each of the media 300 disposed in between.

As shown in FIG. 1, the magnetic disk drive further comprises a ramp section 270 located near the periphery of each of the recording media 300. The ramp section 270 incorporates a plurality of ramps on which the tabs 225 mount. When the slider 210 moves from an inner radius to an outer radius of the medium 300 and the tab 225 reaches the ramp section 270, the tab 225 gets on the ramp so that the slider 210 leaves the surface of the medium 300. If the slider 210 moves toward the inner radius of the medium 300 from the position where the tab 225 is on the ramp, the tab 225 gets off the ramp and the slider 210 is located on the surface of the medium 300. In the manner thus described, according to the embodiment, the ramp-load system that is a type of the load-unload system is employed, so that the slider 210 is made to retreat from the surface of the medium 300 when the medium 300 is stopped, and that the slider 210 is made to face toward the surface of the medium 300 when the medium 300 is rotated.

The ramp section 270, the voice coil motor and the head stack assembly 250 except the sliders 210 correspond to the alignment device of the invention and align the slider 210 with respect to the recording medium 300.

Figure 4:
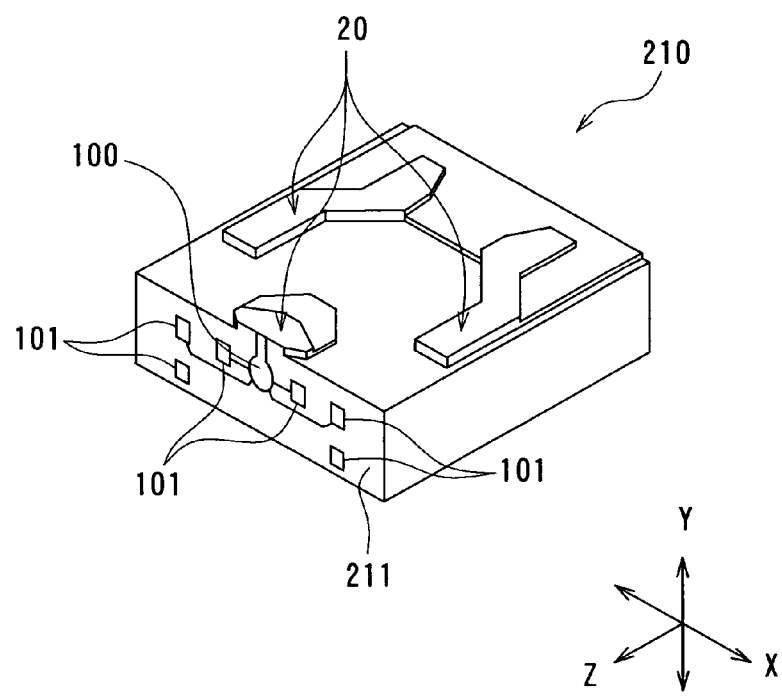
FIG. 4 is a perspective view illustrating a slider of the embodiment of the invention.

FIG. 4 is a perspective view illustrating the slider 210. The slider 210 comprises a slider main body 211 and a protection film described later. The main body 211 is nearly hexahedron-shaped. One of the six surfaces of the main body 211 faces toward the recording medium 300. An air bearing surface 20 as a medium facing surface that faces toward the medium 300 is formed in this one of the six surfaces. The protection film described later is formed to cover the air bearing surface 20 and protects the air bearing surface 20. When the medium 300 rotates in the Z direction of FIG. 3, an airflow passes between the medium 300 and the slider 210 and a lift is thereby generated below the slider 210 in the Y direction of FIG. 4 and exerted on the slider 210. The slider 210 flies over the surface of the medium 300 by means of the lift. The X direction of FIG. 4 is across the tracks of the medium 300. The slider main body 211 includes a thin-film magnetic head element 100. The thin-film magnetic head element 100 is located in a region near an air-outflow-side end (the end located at the lower left of FIG. 4) of the slider 210 and near the air bearing surface 20. Six terminals 101 are provided on an air-outflow-side surface of the main body 211.

Figure 5:
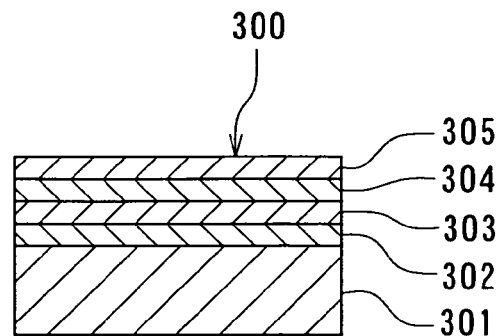
FIG. 5 is a cross-sectional view illustrating the configuration of a recording medium of the embodiment of the invention.

FIG. 5 is a cross-sectional view illustrating the configuration of the recording medium 300. As shown in FIG. 5, the medium 300 comprises a substrate 301, and a cured layer 302, an underlying layer 303, a magnetic layer 304 and a protection layer 305 that are stacked on the substrate 301 one by one. The substrate 301 may be made of an Al alloy or glass, for example. The cured layer 302 is provided for preventing the surface of the substrate 301 from deforming if the substrate 301 is made of an Al alloy. The cured layer 302 may be made of a Ni—P alloy, for example. The underlying layer 303 is provided for controlling the orientation of crystals in the magnetic layer 304. The underlying layer 303 may be made of Cr or a Cr alloy, for example. The magnetic layer 304 is a layer for storing data and may be made of a Co alloy, for example. The protection layer 305 is a solid layer for protecting the magnetic layer 304. The protection layer 305 may be made of a carbon film such as an amorphous carbon film, in particular. In the recording medium 300 of the embodiment, the protection layer 305 is exposed in the surface that faces toward the slider 210. That is, in the medium 300, a film made of liquid lubricant is not provided on the surface that faces toward the slider 210.

Although the cured layer 302, the underlying layer 303, the magnetic layer 304 and the protection layer 305 are stacked one by one also on the bottom surface of the substrate 301 in an actual medium 300, these layers are omitted in FIG. 5.

Figure 6:
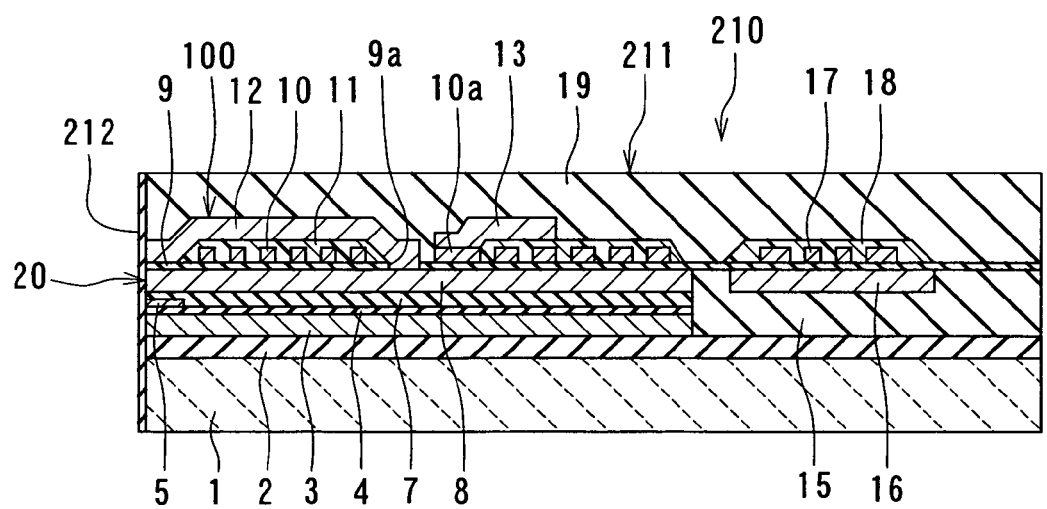
FIG. 6 is a cross-sectional view illustrating a main part of the slider of the embodiment of the invention.
Figure 7:
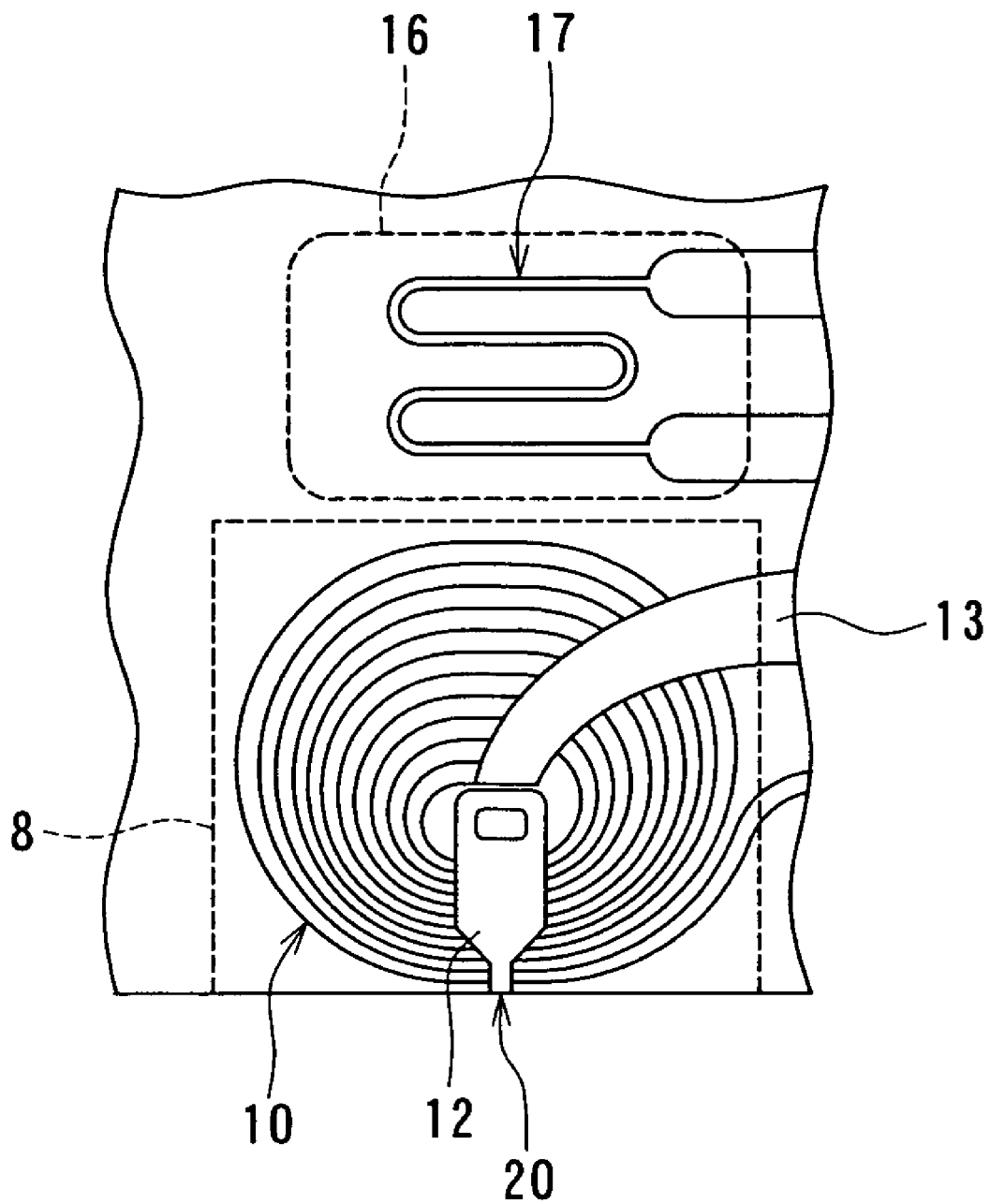
FIG. 7 is a top view illustrating the main part of the slider of the embodiment of the invention.

Reference is now made to FIG. 6 and FIG. 7 to describe the configuration of the slider 210. FIG. 6 is a cross-sectional view illustrating a main part of the slider 210. FIG. 7 is a top view illustrating the main part of the slider 210. The slider 210 comprises: the slider main body 211; and the protection film that is provided to cover the air bearing surface 20 of the slider main body 211 and that protects the air bearing surface 20.

The slider main body 211 comprises: a substrate 1 made of a ceramic such as aluminum oxide and titanium carbide ($Al_2O_3$—TiC); an insulating layer 2 made of an insulating material such as alumina ($Al_2O_3$) and formed on the substrate 1; a bottom shield layer 3 made of a magnetic material and formed on the insulating layer 2; a bottom shield gap film 4 made of an insulating material and formed on the bottom shield layer 3; a magnetoresistive (MR) element 5 formed on the bottom shield gap film 4; a top shield gap film 7 made of an insulating material and formed on the MR element 5; and a bottom pole layer 8 made of a magnetic material and formed on the top shield gap film 7. The bottom pole layer 8 also functions as a top shield layer. Alternatively, a top shield layer, a separating layer made of a nonmagnetic material such as alumina and formed on the top shield layer, and a bottom pole layer formed on the separating layer may be provided in place of the bottom pole layer 8.

The MR element 5 has an end that is located in the air bearing surface 20. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The slider main body 211 further comprises: an insulating layer 15 disposed around the bottom shield layer 3, the bottom shield gap film 4, the top shield gap film 7 and the bottom pole layer 8; and a heat conducting layer 16 formed to be embedded in the insulating layer 15. The insulating layer 15 is made of alumina, for example. The heat conducting layer 16 is made of a metal material such as NiFe. The heat conducting layer 16 may be made of a material the same as that of the bottom pole layer 8. The bottom pole layer 8, the insulating layer 15 and the heat conducting layer 16 have flattened top surfaces.

The slider main body 211 further comprises: a write gap layer 9 made of a nonmagnetic material such as alumina and formed on the bottom pole layer 8, the insulating layer 15 and the heat conducting layer 16; a thin-film coil 10 made of a conductive material such as Cu and formed on the write gap layer 9; an insulating layer 11 covering the thin-film coil 10; and a top pole layer 12 made of a magnetic material and a coil lead layer 13 made of a conductive material, the top pole layer 12 and the coil lead layer 13 being formed on the insulating layer 11. The write gap layer 9 has a contact hole 9a formed in a region away from the air bearing surface 20. The bottom pole layer 8 and the top pole layer 12 are magnetically coupled to each other through the contact hole 9a at a point away from the air bearing surface 20. The bottom pole layer 8 and the top pole layer 12 include pole portions that are located on a side of the air bearing surface 20 and opposed to each other, the write gap layer 9 being placed between these portions. The insulating layer 11 is made of a thermoset photoresist, for example. An end of the coil lead layer 13 is connected to an inner end 10a of the thin-film coil 10.

The slider main body 211 further comprises: a heater 17 formed on the write gap layer 9 in a region above the heat conducting layer 16; and an insulating layer 18 covering the heater 17. The heater 17 corresponds to the heating section of the invention. As shown in FIG. 7, the heater 17 has a shape of bending line. The heater 17 is made of a conductive material such as Cu, Ni, Cr or NiCr. The heater 17 may be made of a material the same as that of the thin-film coil 10. The insulating layer 18 is made of a thermoset photoresist, for example.

The slider main body 211 further comprises an overcoat layer 19 covering the insulating layer 11, the top pole layer 12, the coil lead layer 13 and the insulating layer 18. The overcoat layer 19 is made of alumina, for example.

Although not shown in FIG. 6, the six terminals 101 of FIG. 4 are formed on the top surface of the overcoat layer 19. One of the terminals 101 is connected to the other end of the coil lead layer 13. Another one of the terminals 101 is connected to an outer end of the thin-film coil 10. Another two of the terminals 101 are connected to the MR element 5 through a lead layer not shown. The remaining two of the terminals 101 are connected to both ends of the heater 17.

The slider main body 211 includes the thin-film magnetic head element 100. The thin-film magnetic head element 100 incorporates: a write element for writing data on the recording medium 300; and a read element for reading data stored on the medium 300. The write element incorporates: the bottom pole layer 8 and the top pole layer 12 that are magnetically coupled to each other and include the pole portions located on a side of the air bearing surface 20 and opposed to each other; the write gap layer 9 formed between the pole portion of the bottom pole layer 8 and the pole portion of the top pole layer 12; and the thin-film coil 10 at least part of which is disposed between the bottom pole layer 8 and the top pole layer 12 and insulated from the bottom pole layer 8 and the top pole layer 12.

The read element incorporates: the MR element 5 disposed near the air bearing surface 20; and the bottom shield layer 3 and the top shield layer (the bottom pole layer 8) for shielding the MR element 5, wherein portions of the bottom shield layer 3 and the top shield layer that are located on a side of the air bearing surface 20 are opposed to each other, the MR element 5 being placed between these portions.

In the magnetic disk drive of the embodiment, the slider 210 is moved across the tracks of the recording medium 300, and the slider 210 is thereby aligned with respect to the medium 300. The thin-film magnetic head element 100 that the slider 210 includes writes data on the medium 300 through the use of the write element, and reads data stored on the medium 300 through the use of the read element.

In the embodiment the protection film 212 is made of a tetrahedral amorphous carbon (hereinafter referred to as ta-C) film. The ta-C film is an amorphous carbon film that includes sp3 bonds and sp2 bonds of carbon atoms and includes no hydrogen.

It is preferred that the ta-C film as the protection film 212 be formed by a method called filtered cathodic vacuum arc (FCVA). In FCVA, vacuum arc discharge is established between a cathode made of carbon atoms and an anode to thereby generate carbon ions, which are then introduced to a sample through a filter, so that a ta-C film is formed on the sample.

The magnetic disk drive of the embodiment comprises a distance control device for controlling the distance between the surface of the recording medium 300 and the thin-film magnetic head element 100. The distance control device incorporates: the heater 17 built in the slider main body 211; and a heater control circuit for controlling the heater 17. As will be described later, the heater control circuit is included in the read/write processing circuit of the magnetic disk drive. In the slider main body 211 the heater 17 is located opposite to the air bearing surface 20 with the thin-film magnetic head element 100 disposed in between. The heater control circuit supplies power of specific magnitude to the heater 17 when data is written and when data is read. The heater 17 thereby produces heat. The heat produced by the heater 17 is sent to a neighborhood of the heater 17. The heat conducting layer 16 has a function of effectively conducting the heat produced by the heater 17 to the neighborhood of the heater 17. When the heater 17 produces heat, a portion around the heater 17 inside the slider main body 211 is thermal-expanded, and a portion of the slider main body 211 thereby protrudes so that the thin-film magnetic head element 100 gets closer to the surface of the recording medium 300. The distance between the surface of the medium 300 and the head element 100 is controlled by the power supplied to the heater 17. In the manner thus described, the distance between the surface of the medium 300 and the head element 100 is dynamically controlled by the distance control device so that this distance is smaller when data is written or data is read, compared with other occasions.

Figure 8:
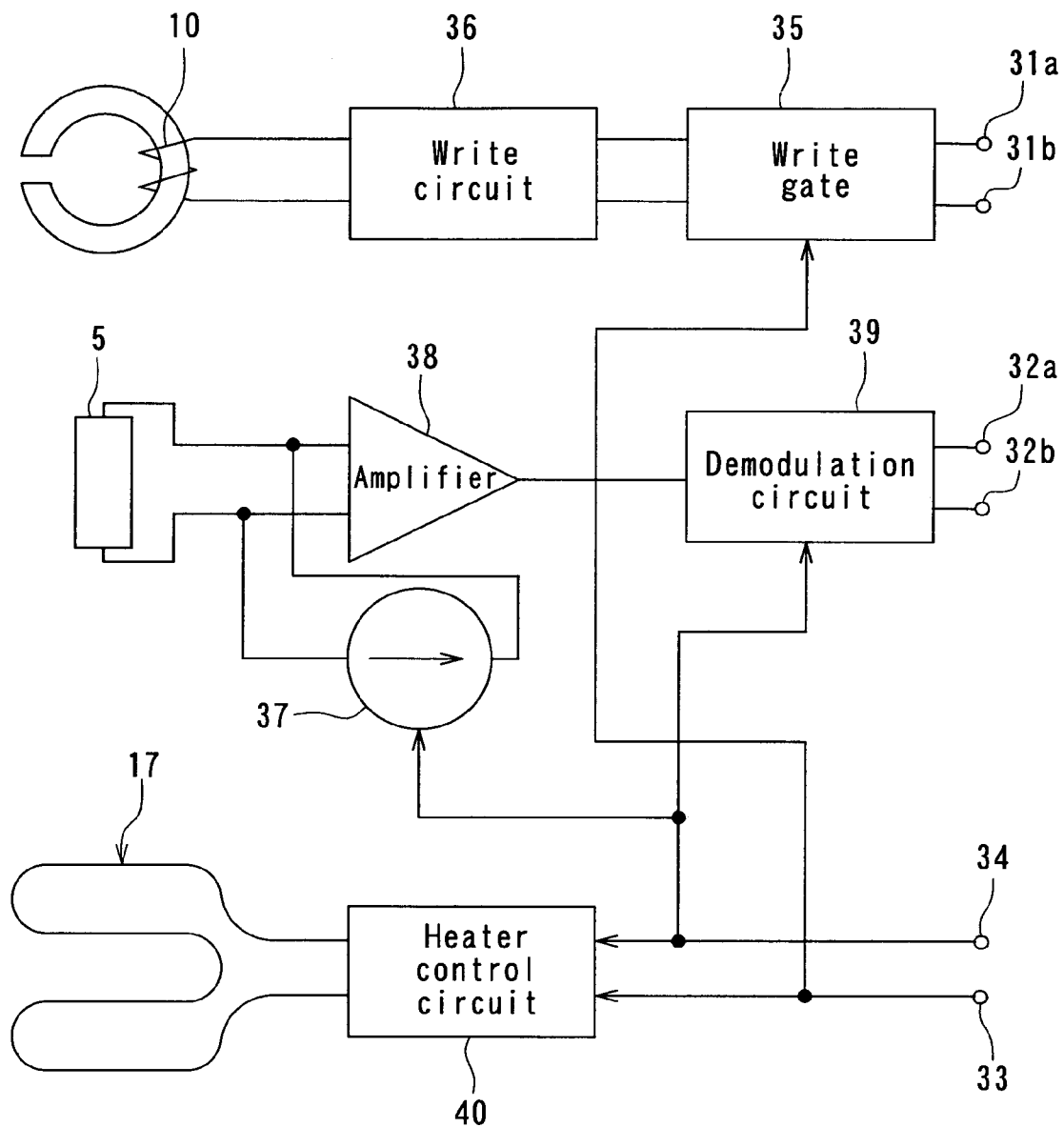
FIG. 8 is a schematic diagram illustrating the configuration of a read/write processing circuit of the embodiment of the invention.

FIG. 8 is a schematic diagram illustrating the configuration of the read/write processing circuit of the magnetic disk drive of the embodiment. The read/write processing circuit comprises: input terminals 31a and 31b receiving write signals corresponding to data to be written on the medium 300; output terminals 32a and 32b outputting read signals corresponding to data read from the medium 300; an input terminal 33 receiving write control signals; and an input terminal 34 receiving read control signals.

The read/write processing circuit further comprises: a write gate 35 connected to the input terminals 31a, 31b and 33; and a write circuit 36 connected to the write gate 35 and the thin-film coil 10. The read/write processing circuit further comprises: a constant-current circuit 37 connected to the MR element 5 and the input terminal 34; an amplifier 38 having an input connected to the MR element 5; and a demodulation circuit 39 connected to an output of the amplifier 38, the output terminals 32a and 32b and the input terminal 34. The read/write processing circuit further comprises the heater control circuit 40 connected to the input terminals 33 and 34 and the heater 17.

In the read/write processing circuit, to write data on the recording medium 300, a write signal is received at the write gate 35 through the input terminals 31a and 31b, and a write control signal is received at the write gate 35 and the heater control circuit 40 through the input terminal 33. The write gate 35 allows the write signal to pass and sends it to the write circuit 36 while the write control signal is received. The write circuit 36 feeds a current to the thin-film coil 10 based on the write signal. As a result, the data is written on the medium 300 by the write element. The heater control circuit 40 supplies power to the heater 17 while the write control signal is received. As a result, as previously described, a portion of the slider main body 211 protrudes so that the thin-film magnetic head element 100 gets closer to the surface of the recording medium 300, and the distance between the surface of the medium 300 and the head element 100 is thereby reduced.

In the read/write processing circuit, to read data from the recording medium 300, a read control signal is received at the constant-current circuit 37, the demodulation circuit 39 and the heater control circuit 40 through the input terminal 34. The constant-current circuit 37 feeds a constant current to the MR element 5 when the read control signal is received. The amplifier 38 amplifies the potential difference across the MR element 5. An output signal of the amplifier 38 is received at the demodulation circuit 39 and demodulated, and then outputted as a read signal from the output terminals 32a and 32b. The heater control circuit 40 supplies power to the heater 17 while the read control signal is received. As a result, as previously described, a portion of the slider main body 211 protrudes so that the thin-film magnetic head element 100 gets closer to the surface of the recording medium 300, and the distance between the surface of the medium 300 and the head element 100 is thereby reduced.

As thus described, according to the embodiment, the distance control device makes the distance between the surface of the medium 300 and the head element 100 smaller when writing is performed by the write element and when reading is performed by the read element, compared with occasions on which neither reading nor writing is performed.

As thus described, in the magnetic disk drive of the embodiment, no film made of liquid lubricant is disposed on the surface of the recording medium 300 that faces toward the slider 210. Therefore, according to the embodiment, there occurs no vibration of the slider 210 resulting from resonance of the slider 210 and a film made of liquid lubricant.

In the embodiment, when the recording medium 300 is stopped, the alignment device makes the slider 210 retreat from the surface of the medium 300. When the medium 300 is rotated, the alignment device makes the slider 210 face toward the surface of the medium 300. Therefore, normally, the slider 210 does not touch the medium 300. In the embodiment the protection film 212 of the slider 210 is made of a ta-C film. The protection film 212 made of the ta-C film has a low friction coefficient. For example, the protection film 212 made of the ta-C film has a friction coefficient about half the friction coefficient of an amorphous carbon film (a diamond-like-carbon film) formed by chemical vapor deposition. As a result, even if the slider 210 touches the medium 300, vibrations of the slider 210 are suppressed. Consequently, there is a small possibility of collision of the slider 210 with the medium 300 resulting from vibrations of the slider 210.

According to the embodiment, the distance between the surface of the recording medium 300 and the thin-film magnetic head element 100 is controlled by the distance control device. It is thereby possible to reduce the distance between the surface of the medium 300 and the head element 100.

The foregoing features of the embodiment make it possible to reduce the distance between the surface of the medium 300 and the head element 100 while preventing vibrations of the slider 210.

The following is a description of results of first to third experiments performed for confirming the effects of the magnetic disk drive of the embodiment as described above.

Figure 9:
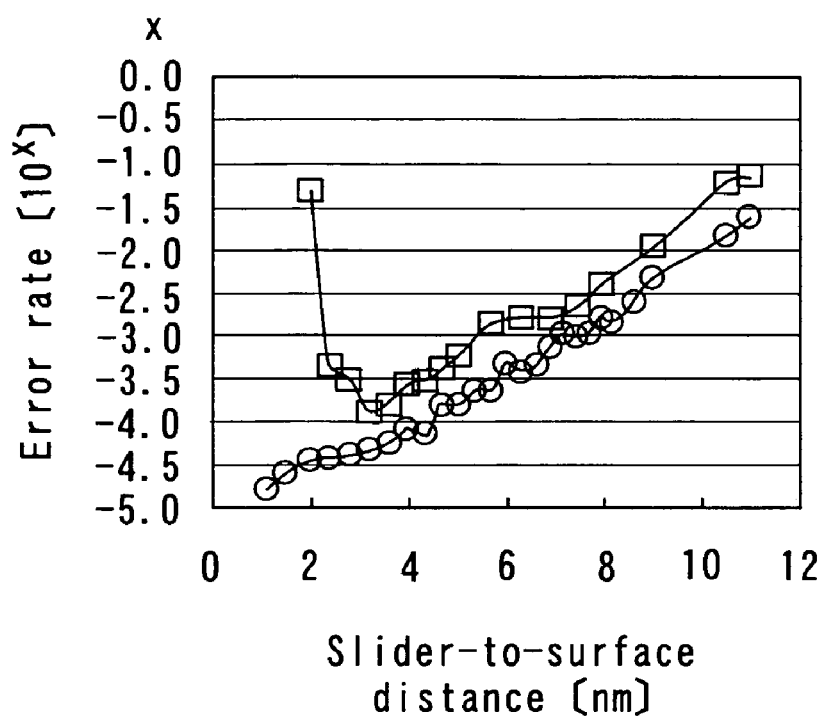
FIG. 9 is a plot showing the result of a first experiment performed for confirming an effect of the embodiment of the invention.
Figure 10:
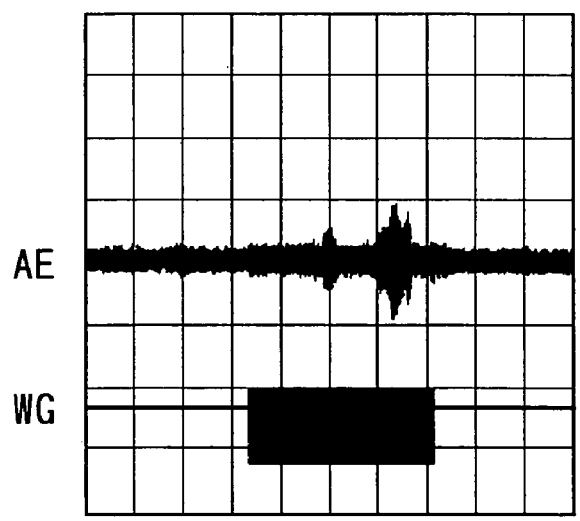
FIG. 10 is a plot showing a waveform indicating the result of examination of vibration of a slider of a reference magnetic disk drive in the first experiment.
Figure 11:
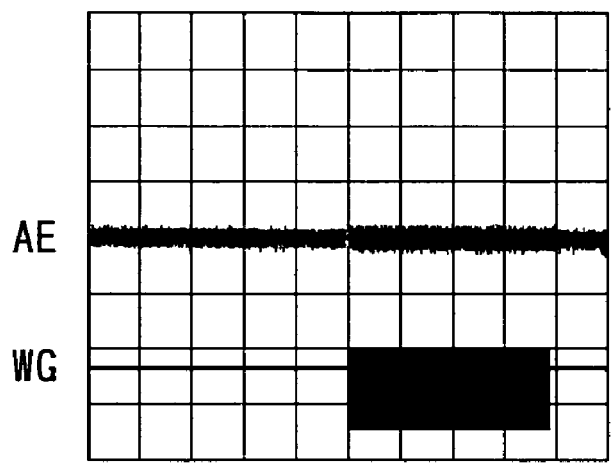
FIG. 11 is a plot showing a waveform indicating the result of examination of vibration of the slider of the embodiment of the invention in the first experiment.

Reference is now made to FIG. 9 to FIG. 11 to describe the result of the first experiment. The first experiment was performed for confirming the effect resulting from the feature that the recording medium 300 of the embodiment had no film made of liquid lubricant. In the first experiment the relationship between an error rate and the distance between the slider and the surface of the medium (hereinafter referred to as the slider-to-surface distance) was obtained for the magnetic disk drive of the embodiment of the invention and a reference magnetic disk drive. The reference magnetic disk drive was the same as the magnetic disk drive of the embodiment except that a recording medium having a lubricating film made of liquid lubricant was employed. In the reference magnetic disk drive the lubricating film had a thickness of 1.5 nm.

FIG. 9 is a plot showing the result of examination of the relationship between the error rate and the slider-to-surface distance of each of the magnetic disk drive of the embodiment of the invention and the reference magnetic disk drive. In FIG. 9, the horizontal axis indicates the slider-to-surface distances, and the vertical axis indicates the error rates. The error rates of FIG. 9 are those obtained on a byte-by-byte basis before error correction. In FIG. 9, circles indicate the error rate of the magnetic disk drive of the embodiment, and squares indicate the error rate of the reference magnetic disk drive.

For the reference magnetic disk drive, in a range in which the slider-to-surface distance is approximately 2.6 nm or greater, the error rate is reduced as the slider-to-surface distance is reduced. For the reference magnetic disk drive, however, the error rate abruptly increases when the slider-to-surface distance is smaller than approximately 2.6 nm. This is attributable to vibrations of the slider due to resonance of the lubricating film and the slider. Here, an examination was performed on vibrations of the slider of the reference magnetic disk drive with the slider-to-surface distance of approximately 2.2 nm, using an acoustic emission (AE) sensor. FIG. 10 shows the result. In FIG. 10, AE indicates a waveform of an output signal of the AE sensor, and WG indicates a waveform of a write gate signal indicating the timing at which the write gate 35 allows a write signal to pass. The period in which the amplitude of the write gate signal is great is the period in which the write gate 35 allows the write signal to pass. FIG. 10 shows a great amplitude of the output signal of the AE sensor, which indicates that the slider of the reference magnetic disk drive greatly vibrates when the slider-to-surface distance is approximately 2.2 nm.

For the magnetic disk drive of the embodiment, on the other hand, in a range in which the slider-to-surface distance is approximately 1.0 nm or greater, the error rate is reduced as this distance is reduced. For the magnetic disk drive of the embodiment, the error rate is smaller than that of the reference magnetic head by about $10^{-0.5}$ in a range in which the distance is approximately 2.6 nm or greater. FIG. 11 shows the result of examination on vibrations of the slider of the embodiment when the slider-to-surface distance is approximately 2.6 nm. The meanings of the letters in FIG. 11 are the same as those in FIG. 10. FIG. 11 indicates that the slider of the embodiment hardly vibrates.

The foregoing first experiment result indicates that the embodiment of the invention makes it possible to prevent vibrations of the slider 210 and also to improve the error rate because of the feature that the recording medium 300 has no film made of liquid lubricant.

Reference is now made to FIG. 12 to FIG. 15 to describe the result of the second experiment. The second experiment was performed for confirming the effect resulting from the feature of the embodiment that the protection film 212 of the slider 210 is made of a ta-C film. In the second experiment, an error rate and vibrations of the slider were examined for each of the magnetic disk drive of the embodiment and the reference magnetic disk drive in the situation in which the slider touches the surface of the recording medium. The reference magnetic disk drive was the same as the magnetic disk drive of the embodiment except that the protection film of the slider was not made of a ta-C film but an amorphous carbon film formed by chemical vapor deposition.

First, an explanation will be given about the necessity for considering the situation in which the slider touches the surface of the recording medium. In the embodiment, when data is written and when data is read, power is supplied to the heater 17, and the distance between the surface of the recording medium 300 and the thin-film magnetic head element 100 is thereby reduced. However, it is required that the slider 210 never touch the surface of the medium 300 when data is written or read. Therefore, in the embodiment, it is required to find out in advance minimum power to be supplied to the heater 17 which can cause the slider 210 to touch the surface of the medium 300 (the power is hereinafter called minimum power for contact), and then to pre-determine power to be supplied to the heater 17 when data is written or read so that it is lower than the minimum power for contact. In a process of finding out the minimum power for contact, the slider 210 touches the surface of the medium 300 although it is for a very short period of time which is around several tens of milliseconds. In addition, the slider 210 may touch the surface of the medium 300 when a shock is applied to the magnetic disk drive from the outside.

Here is given an example of method of obtaining the minimum power for contact. In this example, first, data is written on the recording medium 300 by the write element of the thin-film magnetic head element 100. Next, the supply power to the heater 17 is made zero, and the data is read from the medium 300 by the read element of the head element 100, and the output voltage of the read element at this time is measured. Next, the supply power to the heater 17 is increased, and the output voltage of the read element is measured again. This processing is repeated until an increase in output voltage of the read element is stopped. In such a manner, the relationship between the supply power to the heater 17 and the output voltage of the read element is obtained. The instant when the increase in output voltage of the read element is stopped is the instant when the slider 210 touches the surface of the medium 300. The supply power to the heater 17 at the instant when the increase in output voltage of the read element is stopped is the minimum power for contact when reading is performed. While reading is actually performed, power of a value smaller than the value of the minimum power for contact when reading is performed is supplied to the heater 17. The value of minimum power for contact when writing is performed is obtained by subtracting a value of supply power to the heater 17 from the value of the minimum power for contact when reading is performed, the value of supply power to the heater 17 corresponding to an amount of protrusion of a portion of the slider main body 211 due to the heat produced by the thin-film coil 10 when writing is performed. While writing is actually performed, power of a value smaller than the value of the minimum power for contact when writing is performed is supplied to the heater 17.

The following method may be employed to obtain the value of supply power to the heater 17 corresponding to the amount of protrusion of the portion of the slider main body 211 due to the heat produced by the thin-film coil 10 when writing is performed. First, a plurality of recording media incorporating protection layers having different thicknesses are used to obtain the relationship between the slider-to-surface distance and each of the output voltage of the read element and the overwrite property of the thin-film magnetic head element 100. Next, an amount of change in overwrite property in a period from the start of writing to a point at which the temperature of the head element 100 reaches an equilibrium is measured. Next, the amount of change in overwrite property is converted to an amount of change in the slider-to-surface distance by using the relationship between the overwrite property and the slider-to-surface distance previously obtained. This amount of change in the slider-to-surface distance corresponds to the amount of protrusion of the portion of the slider main body 211 due to the heat produced by the thin-film coil 10 when writing is performed. Next, this amount of change in the slider-to-surface distance is converted to an amount of change in output voltage of the read element by using the relationship between the output voltage of the read element and the slider-to-surface distance previously obtained. Next, the amount of change in output voltage of the read element is converted to an amount of change in supply power to the heater 17 by using the relationship between the supply power to the heater 17 and the output voltage of the read element previously obtained. This amount of change in supply power to the heater 17 corresponds to the supply power to the heater 17 corresponding to the amount of protrusion of the portion of the slider main body 211 due to the heat produced by the thin-film coil 10 when writing is performed.

Figure 12:
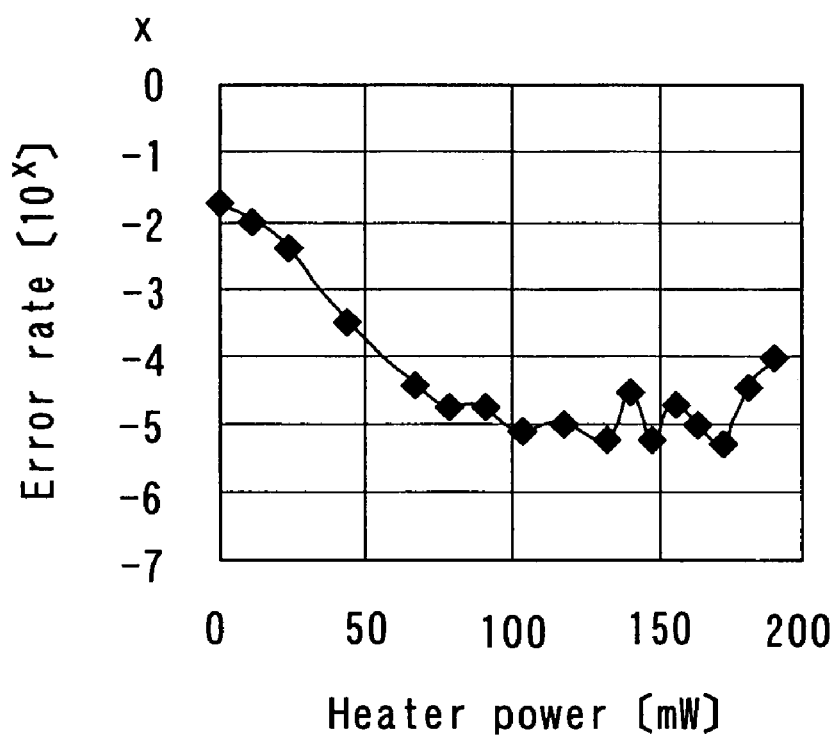
FIG. 12 is a plot showing the result of determining the relationship between the supply power to a heater and the error rate of the reference magnetic disk drive in a second experiment performed for confirming an effect of the embodiment of the invention.
Figure 14:
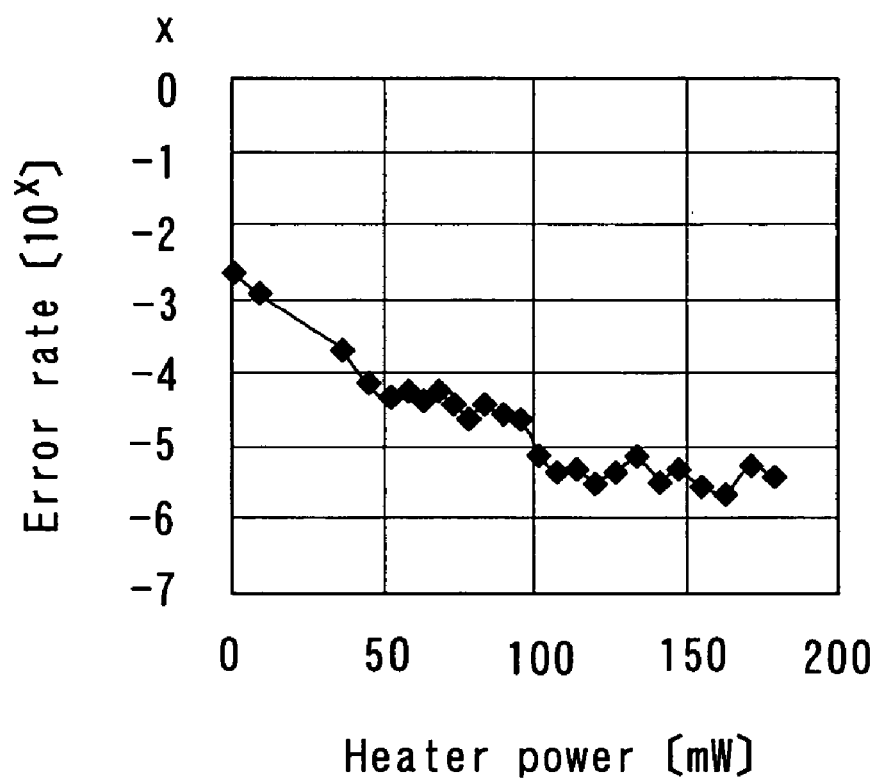
FIG. 14 is a plot showing the result of determining the relationship between the supply power to the heater and the error rate of the magnetic disk drive of the embodiment of the invention in the second experiment.

FIG. 12 is a plot showing the result of examination of the relationship between the error rate and the supply power to the heater 17 when writing is performed for the reference magnetic disk drive in the second experiment. FIG. 14 is a plot showing the result of examination of the relationship between the error rate and the supply power to the heater 17 when writing is performed for the magnetic disk drive of the embodiment in the second experiment. In FIG. 12 and FIG. 14, the horizontal axis indicates the supply power to the heater 17, and the vertical axis indicates the error rates. The error rates of FIG. 12 and FIG. 14 are those obtained on a byte-by-byte basis before error correction. For each of the reference magnetic disk drive and the magnetic disk drive of the embodiment, in a range in which the supply power to the heater 17 is 150 mW or greater, the error rate is not reduced even if the supply power to the heater 17 is increased. This indicates that, for each of the reference magnetic disk drive and the magnetic disk drive of the embodiment, the slider touches the surface of the recording medium 300 when the supply power to the heater 17 is 150 mW while writing is performed. If comparison is made between FIG. 12 and FIG. 14, it is noted that the error rate of the magnetic disk drive of the embodiment is lower than that of the reference magnetic disk drive.

Figure 13:
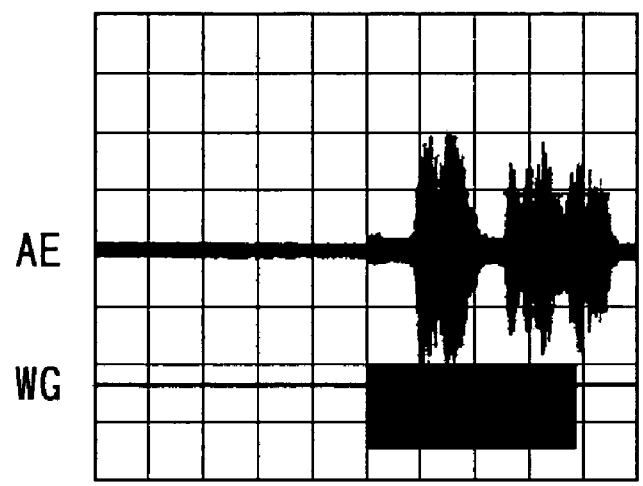
FIG. 13 is a plot showing a waveform indicating the result of examination of vibration of the slider of the reference magnetic disk drive in the second experiment.
Figure 15:
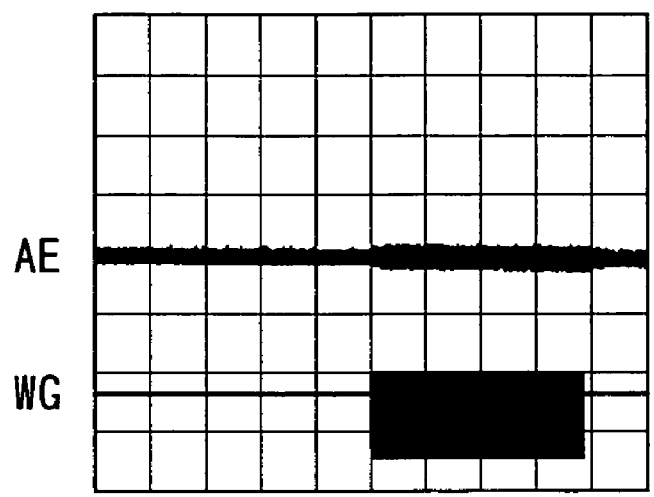
FIG. 15 is a plot showing a waveform indicating the result of examination of vibration of the slider of the embodiment of the invention in the second experiment.

FIG. 13 shows the result of examination of vibrations of the slider of the reference magnetic disk drive when the supply power to the heater 17 was 150 mW in the second experiment. FIG. 15 shows the result of examination of vibrations of the slider of the magnetic disk drive of the embodiment when the supply power to the heater 17 was 150 mW in the second experiment. In FIG. 13 and FIG. 15, AE indicates a waveform of an output signal of the AE sensor, and WG indicates a waveform of a write gate signal. FIG. 13 indicates that the slider of the reference magnetic disk drive greatly vibrates when the slider touches the surface of the recording medium 300. In contrast, FIG. 15 indicates that the slider of the magnetic disk drive of the embodiment hardly vibrates even when the slider touches the surface of the medium 300.

The foregoing second experiment result indicates that the embodiment of the invention makes it possible to suppress vibrations of the slider 210 even when the slider 210 touches the surface of the recording medium 300, because of the feature that the protection film 212 of the slider 210 is made of a ta-C film and the protection film 212 has a low friction coefficient. Consequently, according to the embodiment, there is a small possibility of collision of the slider 210 with the medium 300 resulting from vibrations of the slider 210.

Figure 16:
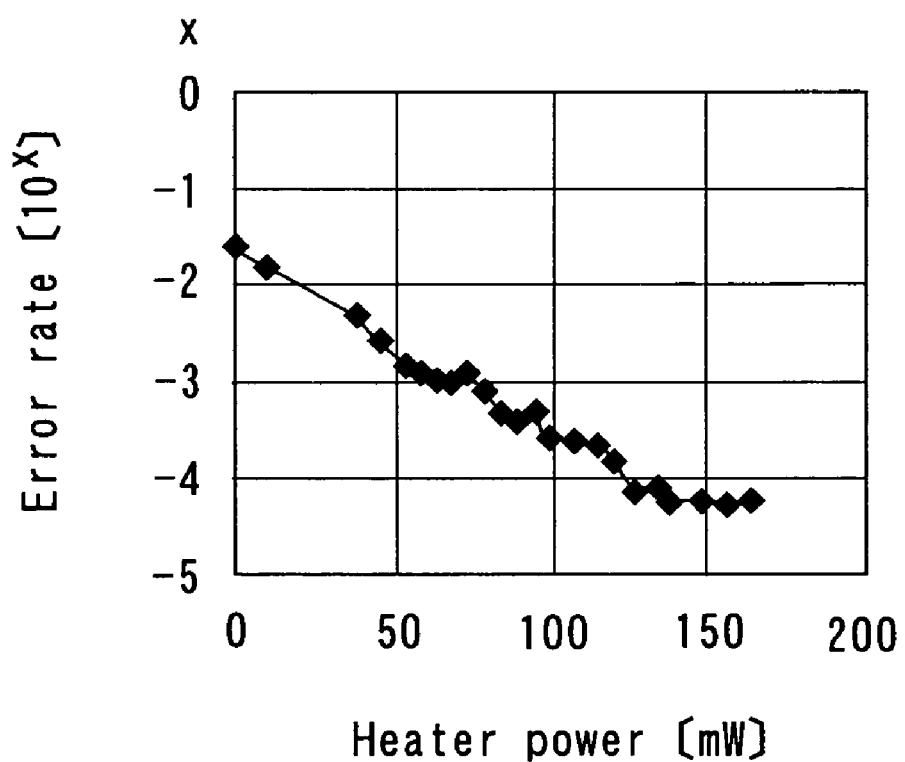
FIG. 16 is a plot showing the result of determining the relationship between the supply power to the heater and the error rate of the magnetic disk drive of the embodiment of the invention in a third experiment performed for confirming an effect of the embodiment of the invention.
Figure 17:
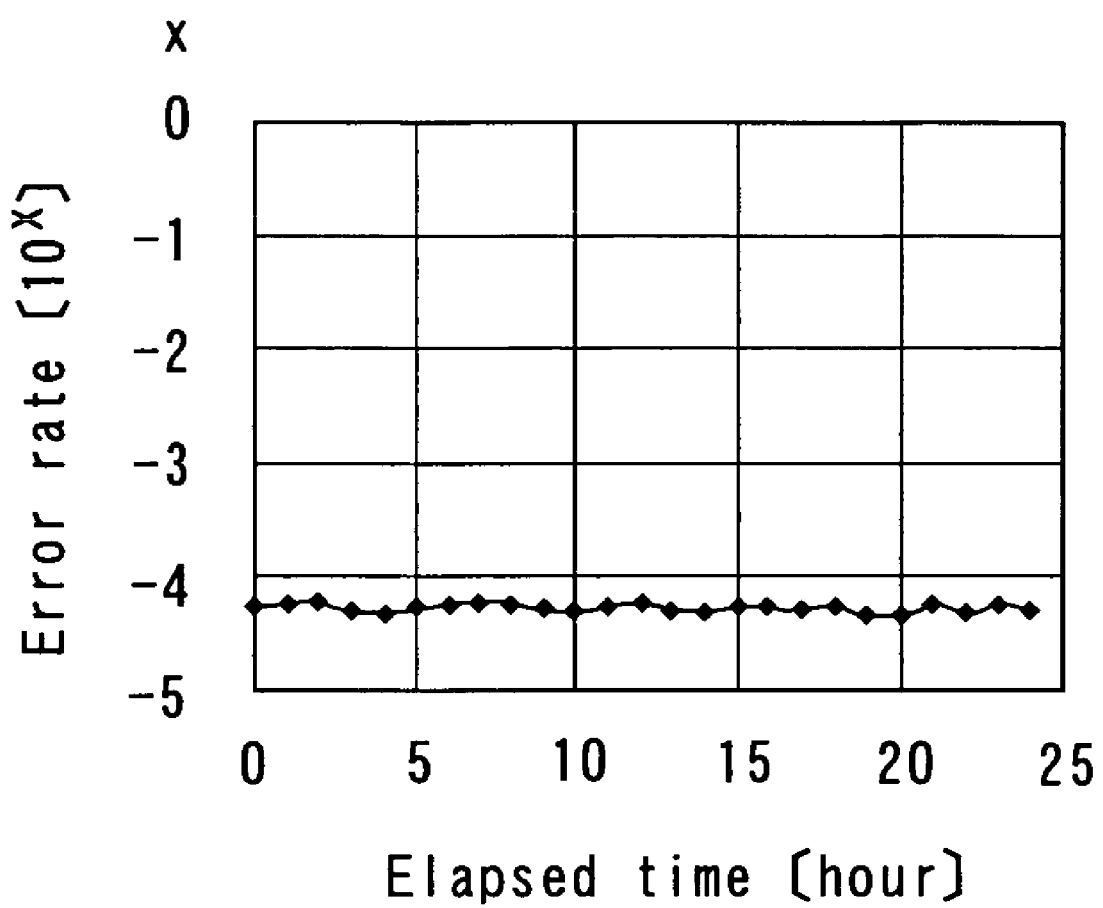
FIG. 17 is a plot showing the result of examination of chronological changes in error rate of the magnetic disk drive of the embodiment of the invention in the third experiment.

Reference is now made to FIG. 16 and FIG. 17 to describe the result of the third experiment. The third experiment was performed for confirming the reliability of the magnetic disk drive of the embodiment. In the third experiment, the protection layer 305 of the recording medium 300 was an amorphous carbon film having a thickness of 20 nm formed by chemical vapor deposition. In addition, in the third experiment, the protection film 212 of the slider 210 was a ta-C film having a thickness of 30 nm formed by FCVA.

In the third experiment, first, as shown in FIG. 16, the error rate was measured when writing was performed while gradually increasing the supply power to the heater 17. In FIG. 16, the horizontal axis indicates the supply power to the heater 17, and the vertical axis indicates the error rates. The error rates of FIG. 16 are those obtained on a byte-by-byte basis before error correction. FIG. 16 shows that, in a range in which the supply power to the heater 17 is 150 mW or greater, the error rate is not reduced even if the supply power to the heater 17 is increased. This indicates that the slider touches the surface of the recording medium 300 when the supply power to the heater 17 is 150 mW while writing is performed.

In the third experiment, the error rate was then measured every one hour while performing writing for twenty-four hours wherein the supply power to the heater 17 was 150 mW. During the period of this measurement, the slider 210 was kept touching the surface of the recording medium 300 while being pressed to the surface of the medium 300 with a little force. When the magnetic disk drive of the embodiment is actually used, however, the slider 210 will never keep on touching the surface of the medium 300 for such a long time. FIG. 17 shows the result of the measurement. In FIG. 17, the horizontal axis indicates the elapsed time, and the vertical axis indicates the error rates. The error rates of FIG. 17 are those obtained on a byte-by-byte basis before error correction. FIG. 17 shows that there is no degradation in error rate even though the slider 210 touches the surface of the medium 300. This indicates that, according to the embodiment, high reliability is obtained even though the medium 300 has no lubricating film made of liquid lubricant.

The present invention is not limited to the foregoing embodiment but may be practiced in still other ways. For example, in the invention, the alignment device may make the slider retreat from the surface of the recording medium when the medium is stopped and may make the slider face toward the surface of the medium when the medium is rotated through the use of a load-unload system other than the ramp-load system.

In the invention the distance control device is not limited to one having the heater 17 built in the slider main body 211 but may be one for controlling the distance between the recording medium and the thin-film magnetic head element through the use of a micro-actuator utilizing the piezoelectric effect or the magnetostrictive effect.

The thin-film magnetic head element disclosed in the foregoing embodiment has such a configuration that the read element is formed on the base body and the write element is stacked on the read element. Alternatively, the read element may be stacked on the write element.

Obviously many modifications and variations of the present invention are possible in the light of the above teachings. It is therefore to be understood that within the scope of the appended claims the invention may be practiced otherwise than as specifically described.

What is claimed is:

1. A magnetic disk drive comprising:
   a recording medium that is driven to be rotated;
   a slider disposed to face toward the recording medium; and
   an alignment device for aligning the slider with respect to the recording medium, wherein:
   the recording medium has a surface facing toward the slider, and no film made of liquid lubricant is disposed on this surface;

the slider incorporates: a slider main body including a medium facing surface that faces toward the recording medium and a thin-film magnetic head element disposed near the medium facing surface; and a protection film for protecting the medium facing surface;

the protection film is made of a tetrahedral amorphous carbon film; and the alignment device makes the slider retreat from the surface of the recording medium when the medium is stopped, and makes the slider face toward the surface of the medium when the medium is rotated, the magnetic disk drive further comprising a distance control device for controlling a distance between the surface of the recording medium and the thin-film magnetic head element.

2. The magnetic disk drive according to claim 1, wherein the distance control device incorporates a heating section built in the slider main body.

3. The magnetic disk drive according to claim 1, wherein: the recording medium incorporates a magnetic layer and a solid protection layer for protecting the magnetic layer; and the protection layer is exposed in the surface.

4. The magnetic disk drive according to claim 1, wherein:

the thin-film magnetic head element incorporates: a write element for writing data on the recording medium; and a read element for reading data written on the recording medium; and the distance control device makes the distance between the surface of the recording medium and the thin-film magnetic head element smaller when writing is performed by the write element and when reading is performed by the read element, compared with occasions on which neither writing nor reading is performed.

* * * * *